UNITED STATES PATENT OFFICE.

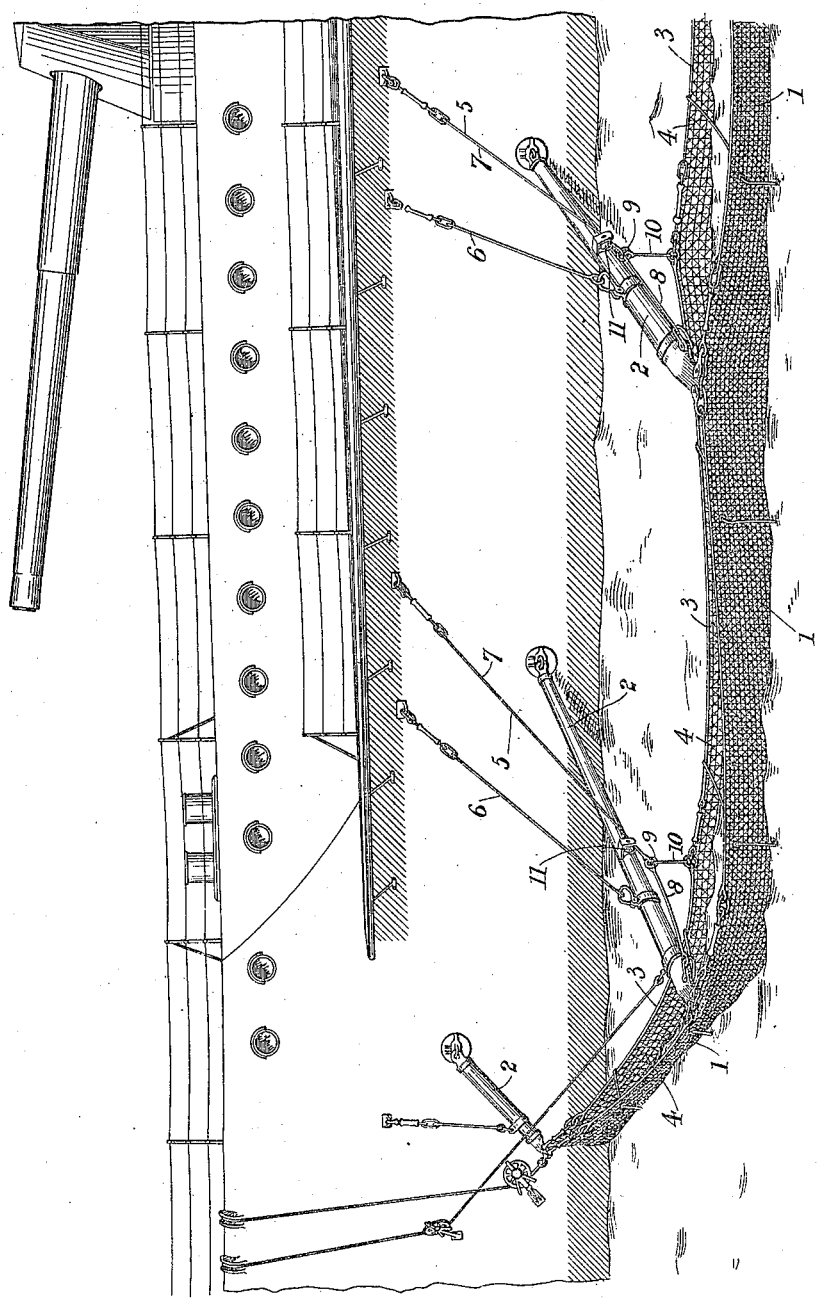

GEORGE MAY SELBY, OF MILLWALL, LONDON, ENGLAND.

CONNECTION WITH DUPLEX OR MULTIPLE ARRANGEMENT OF TORPEDO-NETS FOR FACILITATING THE MANIPULATION OR BRAILING THEREOF.

1,145,806.     Specification of Letters Patent.    Patented July 6, 1915.

Application filed February 11, 1915. Serial No. 7,640.

*To all whom it may concern:*

Be it known that I, GEORGE MAY SELBY, a subject of the King of Great Britain, residing at West Ferry Road, Millwall, in the county of London, England, have invented new and useful Improvements in Connection with Duplex or Multiple Arrangements of Torpedo-Nets for Facilitating the Manipulation or Bracing Thereof, of which the following is a specification.

This invention relates to duplex, or multiple, arrangements of torpedo nets and has for its object to provide simple and efficient means whereby the inner net, or inner nets, can be more quickly and readily brought to its, or their, defensive, or out-board, position, at a suitable distance from the outer net, than hitherto, the arrangement of the means according to this invention being such that, when desired, the said inner net, or inner nets, can be caused to lie against, or be adjacent to, the outer net when the said outer net is in its defensive, or out-board position, and also such that the brailing of the inner net, or inner nets, can be effected simultaneously with the brailing of the outer net.

I will describe this invention with reference to the accompanying drawing which illustrates so much of the forepart of a ship as is necessary to illustrate an example of the application thereto of a duplex arrangement of torpedo nets in accordance with my invention, the said nets being shown in their defensive, or out-board, position, it being understood, however, that the invention is not limited to the said duplex arrangement as the invention is applicable also to arrangements in which three, or more, nets are employed.

The outer net 1 is carried by booms 2 attached to the ship's side in the usual, or any suitable, manner, and is provided with means (not shown in the drawing) for brailing, such, for example, as the means described and illustrated in the specification and drawing of Letters Patent No. 465 A. D. 1910, granted to Bullivant and Selby.

The fore and aft ends of the upper run 3 of the inner net 4 are attached to the booms 2 to which the fore and aft ends of the outer net 1 are attached, and the said upper run 3 is suspended, according to this invention, from one (5) of a pair of topping-ropes 5, 6, appertaining to each of the intermediate booms 2. Each of the topping-ropes 5, to which the inner net 4 is connected, preferably consists of two lengths 7 and 8, joined by an eye-ring 9 to which eye-ring the inner net 4 is connected by a rope 10, or its equivalent, of suitable length. One end of the said topping-rope 5 is connected to the ship's side by any suitable means, preferably such as will permit of the said end being easily and readily attached and detached from the ship's side when desired, and the other end of the said rope is suitably connected to the outer end of its boom. An antifriction guide roller 11 may be provided on the boom, on the underside of which roller the topping-rope 5 bears. When the booms 2 are in-board the topping-ropes 5 connected to the inner net 4 will cause the said net to be lowered to an extent in accordance with the amount of slack which would have been present in the said ropes had not the said net been suspended therefrom, as aforesaid, and will also cause the said net to lie against, or be in close proximity to, the outer net 1. Out-board movement of the booms 2 causes the outer and the inner nets to be brought into the defensive position (as shown in the drawing) the inner net being, at the same time, automatically raised, so that its upper part is above the upper part of the outer net, and caused to be in a predetermined position in-board of the said outer net.

By passing the brails described and shown, in the specification and drawing of the aforesaid Letters Patent No. 465 A. D. 1910 down the in-board side of the inner net 4 and up the out-board side of the outer net 1 simultaneous brailing of the nets can be effected.

The inner net 4 can be caused to lie against, or be in close proximity to, the outer net 1 when the said outer net is in its defensive position, by detaching from the ship's side the ends 7 of the topping-ropes 5 from which the inner net 4 is suspended, whereupon it swings down by gravity on the short length 8 of the topping rope 5, the outer end of which is secured to the boom adjacent the point of suspension of the outer net.

What I claim is—

1. Means for manipulating torpedo nets, comprising outer and inner nets, booms from which said nets are suspended, topping ropes for said booms connected at their inner ends to the ship's side and at their outer ends to the outer ends of the booms and means for suspending the inner net from said topping ropes.

2. Means for manipulating torpedo nets, comprising outer and inner nets, booms from which said nets are suspended, topping ropes for said booms detachably connected at their inner ends to the ship's side and at their outer ends to the outer ends of the booms and means for suspending the inner net from said topping ropes.

3. Means for manipulating torpedo nets, comprising outer and inner nets, booms from which said nets are suspended, topping ropes for said booms connected at their inner ends to the ship's side and at their outer ends to the outer ends of the booms, said topping ropes each consisting of two lengths, and an eye ring connecting the same, and means for suspending said inner net from said eye rings.

4. Means for manipulating torpedo nets, comprising outer and inner nets, booms from which said nets are suspended, topping ropes for said booms connected at their inner ends to the ship's side and at their outer ends to the outer ends of the booms and means for suspending the inner net from said topping ropes, together with antifriction guide means on said booms against which the topping ropes bear.

In testimony whereof I have signed my name to this specification in the presence of two subscribing witnesses.

GEORGE MAY SELBY.

Witnesses:
HAROLD ARTHUR STANSELL,
JOHN EVERETT PARTNER.

Copies of this patent may be obtained for five cents each, by addressing the "Commissioner of Patents, Washington, D. C."